United States Patent
Kim et al.

(10) Patent No.: US 11,973,353 B2
(45) Date of Patent: Apr. 30, 2024

(54) ELECTRONIC DEVICE AND METHOD FOR TRANSMITTING INFORMATION TO EXTERNAL DEVICE FOR ADJUSTING WIRELESS POWER TO BE TRANSMITTED FROM EXTERNAL DEVICE ON BASIS OF PROXIMITY OF EXTERNAL OBJECT

(71) Applicant: Samsung Electronics Co., Ltd., Suwon-si (KR)

(72) Inventors: Yongyoun Kim, Suwon-si (KR); Seho Park, Suwon-si (KR); Soon Park, Suwon-si (KR); Jeongmin Moon, Suwon-si (KR); Byunghwa Park, Suwon-si (KR); Keumsu Song, Suwon-si (KR); Sunghoon Song, Suwon-si (KR); Yongsang Yun, Suwon-si (KR); Chihyun Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 540 days.

(21) Appl. No.: 17/055,516

(22) PCT Filed: May 13, 2019

(86) PCT No.: PCT/KR2019/005728
§ 371 (c)(1),
(2) Date: Nov. 13, 2020

(87) PCT Pub. No.: WO2019/221466
PCT Pub. Date: Nov. 21, 2019

(65) Prior Publication Data
US 2021/0203191 A1     Jul. 1, 2021

(30) Foreign Application Priority Data

May 15, 2018 (KR) .......................... 10-2018-0055240

(51) Int. Cl.
*H02J 50/60* (2016.01)
*H02J 50/10* (2016.01)
(Continued)

(52) U.S. Cl.
CPC .............. *H02J 50/60* (2016.02); *H02J 50/10* (2016.02); *H02J 50/23* (2016.02); *H02J 50/40* (2016.02); *H02J 2310/22* (2020.01)

(58) Field of Classification Search
CPC ..................................................... H02J 50/10
(Continued)

(56) References Cited

U.S. PATENT DOCUMENTS 9,655,056 B2 *   5/2017   Hao ........................ H01Q 1/245
10,128,699 B2 * 11/2018  Leabman ................. H02J 50/20
(Continued)

FOREIGN PATENT DOCUMENTS

JP     2016-021866 A     2/2016
KR    10-2013-0035905 A  4/2013
(Continued)

OTHER PUBLICATIONS

International Search Report and Written Opinion of the International Searching Authority in connection with International Application No. PCT/KR2019/005728 dated Aug. 29, 2019, 11 pages.
(Continued)

*Primary Examiner* — Edward Tso
*Assistant Examiner* — Ahmed H Omar

(57) ABSTRACT

An electronic device according to various embodiments comprises a communication module, a sensor module, a wireless charging antenna, a wireless charging module connected to the wireless charging antenna, and at least one processor, wherein the at least one processor may be configured to: receive a signal related to wireless charging from an external device through the communication module;
(Continued)

check information indicating the degree of proximity between at least a part of a human body and the electronic device by using the sensor module at least on the basis of the signal; transmit, to the external device, data for adjusting wireless power to be output by the external device at least on the basis of the information; and receive the adjusted wireless power from the external device through the wireless charging module.

7 Claims, 7 Drawing Sheets

(51) Int. Cl.
*H02J 50/23* (2016.01)
*H02J 50/40* (2016.01)

(58) Field of Classification Search
USPC .......................................................... 320/108
See application file for complete search history.

(56) References Cited

U.S. PATENT DOCUMENTS

| | | | |
|---|---|---|---|
| 10,727,889 B2 | 7/2020 | Ban et al. | |
| 2009/0284082 A1 | 11/2009 | Mohammadian | |
| 2013/0082651 A1* | 4/2013 | Park | H02J 50/80 |
| | | | 320/108 |
| 2016/0165551 A1* | 6/2016 | Lagnado | H04W 52/283 |
| | | | 370/311 |
| 2016/0301264 A1 | 10/2016 | Zeine et al. | |
| 2016/0374049 A1 | 12/2016 | Ha | |
| 2017/0041046 A1 | 2/2017 | Shylendra et al. | |
| 2017/0085120 A1 | 3/2017 | Leabman et al. | |
| 2017/0110888 A1 | 4/2017 | Leabman | |
| 2017/0192486 A1* | 7/2017 | Park | H04B 5/0075 |
| 2018/0070578 A1 | 3/2018 | Choe et al. | |
| 2019/0148987 A1* | 5/2019 | Jung | H02J 50/10 |
| | | | 307/104 |
| 2019/0334387 A1* | 10/2019 | Swan | H02J 50/90 |

FOREIGN PATENT DOCUMENTS

| | | |
|---|---|---|
| KR | 10-2013-0068921 A | 6/2013 |
| KR | 10-2013-0070612 A | 6/2013 |
| KR | 10-2016-0149710 A | 12/2016 |
| KR | 10-2017-0035338 A | 3/2017 |
| KR | 10-2017-0082029 A | 7/2017 |
| KR | 10-2018-0028921 A | 3/2018 |
| KR | 10-2018-0038205 A | 4/2018 |
| KR | 10-2018-0044081 A | 5/2018 |
| WO | 2018024913 A1 | 2/2018 |

OTHER PUBLICATIONS

Notice of Patent Grant dated Jun. 16, 2023, in connection with Korean Application No. 10-2018-0055240, 5 pages.

Notice of Preliminary Rejection dated Dec. 12, 2022 in connection with Korean Patent Application No. 10-2018-0055240, 20 pages.

* cited by examiner

ELECTRONIC DEVICE AND METHOD FOR TRANSMITTING INFORMATION TO EXTERNAL DEVICE FOR ADJUSTING WIRELESS POWER TO BE TRANSMITTED FROM EXTERNAL DEVICE ON BASIS OF PROXIMITY OF EXTERNAL OBJECT

CROSS-REFERENCE TO RELATED APPLICATIONS

This application is a 371 National Stage of International Application No. PCT/KR2019/005728, filed May 13, 2019, which claims priority to Korean Patent Application No. 10-2018-0055240, filed May 15, 2018, the disclosures of which are herein incorporated by reference in their entirety.

BACKGROUND

1. Field

The disclosure relates to an electronic device and method for transmitting information for adjusting wireless power to be transmitted from an external device to an external device based on proximity to an external object.

2. Description of Related Art

Wireless charging technology has recently been popularized for use with electronic devices such as smart phones, home appliances, and automobiles. Due to the development of wireless charging technology, an electronic device can receive power from a power supply source without being connected in a wired manner. If the electronic device and a power transmission device are located within a certain distance (e.g., a few millimeters, a few centimeters, or a few meters) from each other, the electronic device may charge a battery by receiving power wirelessly using electromagnetic induction, electromagnetic resonance, or electromagnetic radiation.

SUMMARY

However, when a user receives high-energy power from a power transmission device while the user is close to an electronic device, such as when the user enters a wireless charging area while carrying the electronic device or accesses the electronic device that is being wirelessly charged, it may have a harmful effect on the user.

Various embodiments may provide an electronic device and method for preventing a human body from being exposed to a high level of radiated power and for minimizing harm to the human body.

The technical subjects pursued in the disclosure may not be limited to the above mentioned technical subjects, and other technical subjects which are not mentioned may be clearly understood, through the following descriptions, by those skilled in the art to which the disclosure pertains.

An electronic device according to various embodiments may include: a communication module; a sensor module; a wireless charging antenna; a wireless charging module configured to be connected to the wireless charging antenna; and at least one processor, wherein the at least one processor is configured to: receive a signal related to wireless charging from an external device through the communication module; check information indicating the degree of proximity between at least a part of a human body and the electronic device using the sensor module based at least on the signal; transmit, to the external device, data for adjusting wireless power to be output by the external device based at least on the information; and receive the adjusted wireless power from the external device through the wireless charging module.

A device for wirelessly transmitting power according to various embodiments may include: a communication module; a wireless charging module; and at least one processor, wherein the at least one processor is configured to: transmit a signal related to wireless charging through the communication module; receive, from an external device, data for adjusting the wireless power to be output by the device, the data being based on information indicating the degree of proximity between the external device and at least a part of a human body identified using a sensor module of the external device; and transmit power adjusted based on the data to the external device through the wireless charging module.

An electronic device according to various embodiments may include: a battery; a coil; a power reception circuit configured to be electrically connected to the coil and the battery; a sensor module; and at least one processor, wherein the at least one processor is configured to: acquire power received from an external electronic device through the coil; check the proximity to an external object using the sensor module while acquiring the power; and transmit, to the external device, information for adjusting the power by the external device based at least on the proximity.

An apparatus and method according to various embodiments of the disclosure may minimize harm to a human body in a process of performing wireless charging by using a sensor module configured to detect whether a human body is close to an electronic device.

Advantageous effects obtainable from the disclosure may not be limited to the above mentioned effects, and other effects which are not mentioned may be clearly understood, through the following descriptions, by those skilled in the art to which the disclosure pertains.

DETAILED DESCRIPTION

Figure 1:
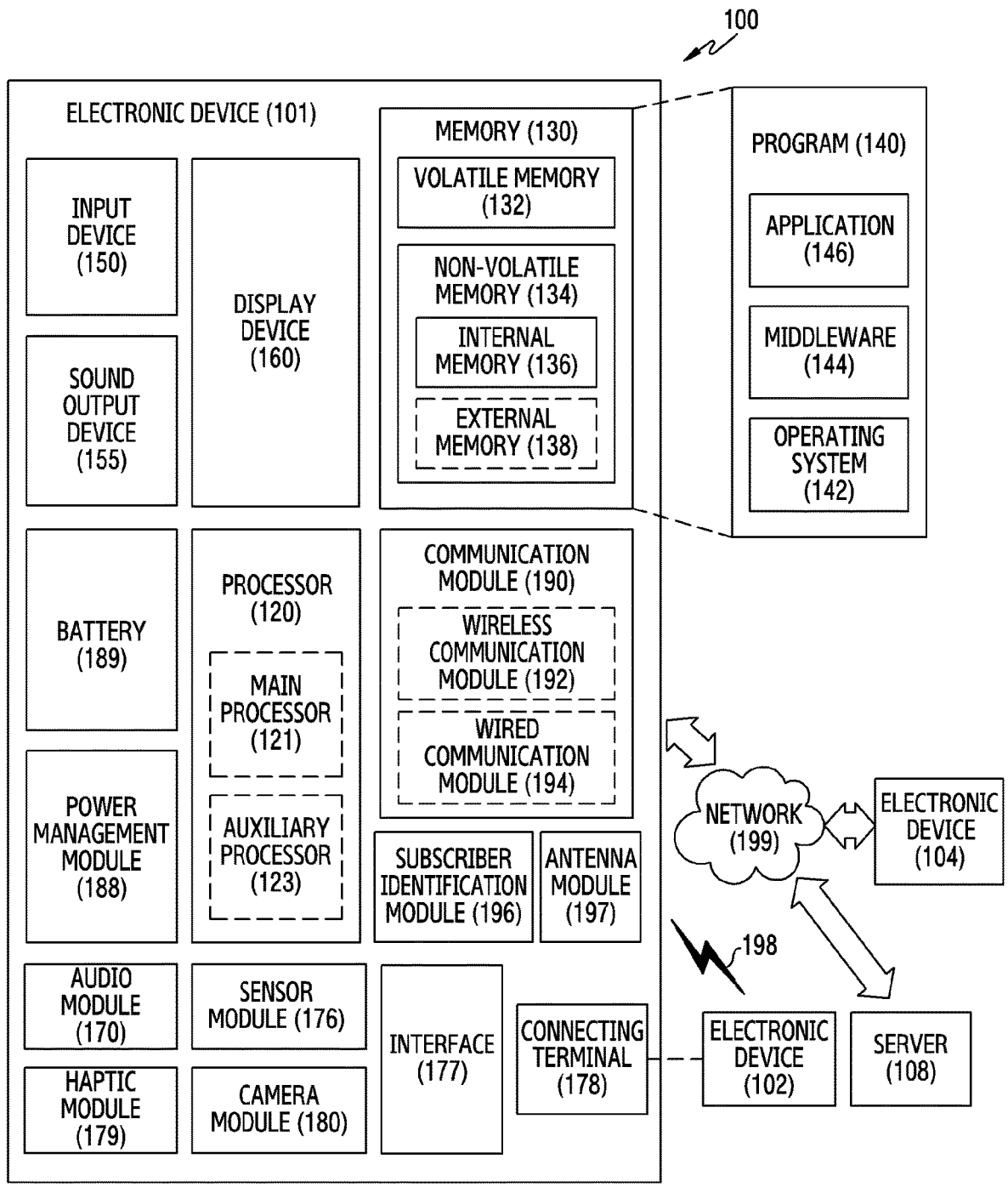
FIG. 1 is a block diagram of an electronic device in a network environment according to various embodiments.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively, or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally, or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
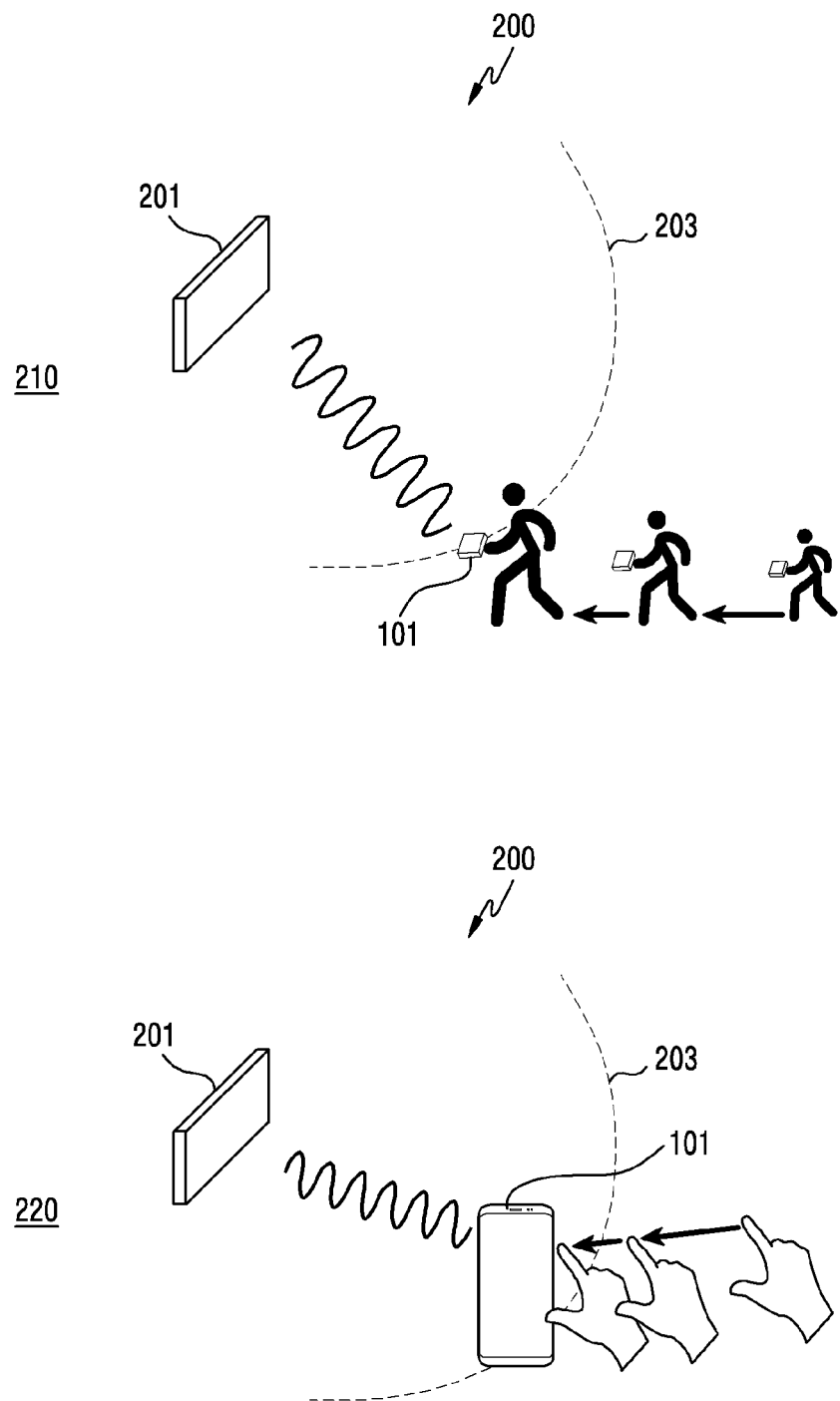
FIG. 2 illustrates an example of a situation for a network environment including an electronic device and a power transmission device according to various embodiments.

FIG. 2 illustrates an example of a situation for a network environment 200 including an electronic device 101 and a power transmission device 201 according to various embodiments.

Referring to FIG. 2, the network environment 200 may include an electronic device 101 and a power transmission device 201. The electronic device 101 may include, for example, a smart phone, a wearable device, a robot cleaner, a home appliance, and the like. The power transmission device 201 is a device capable of wirelessly transmitting power to the electronic device 101, and may be a power transmitter. The electronic device 101 may wirelessly receive power from the power transmission device 201 to charge a battery (e.g., the battery 189) of the electronic device 101.

The electronic device 101 may wirelessly receive power from the power transmission device 201 within an area 203 within which wireless charging is possible. The area 203 is a wireless charging area, and may be the vicinity of the power transmission device 201. The area 203 may be an area in which the electronic device 101 can be identified by the power transmission device 201. The area 203 may be an area in which a certain level of power can be received from the power transmission device 201 by the electronic device 101. The area 203 may be an area having a designated radius around the power transmission device 201.

For example, the power transmission device 201 may wirelessly transmit power to the electronic device 101 spaced apart from the power transmission device 201 using electromagnetic radiation. The power transmission device 201 may generate and transmit an electromagnetic wave having a high-energy frequency. The electronic device 101 may receive the electromagnetic wave using an antenna (e.g., the antenna module 197) and may convert the same into power using a rectifier.

As another example, the power transmission device 201 may wirelessly transmit power to the electronic device 101 spaced apart from the power transmission device 201 through an electromagnetic resonance phenomenon. The power transmission device 201 may generate an electromagnetic field that vibrates at a resonant frequency through a transmitter coil. The electronic device 101 may receive energy through a receiver coil designed in consideration of the resonant frequency. By using a resonance phenomenon between the transmitter coil and the receiver coil, wireless charging may be possible at a distance of several meters.

As described above, the electronic device 101 may use an electromagnetic radiation method or an electromagnetic resonance method to wirelessly receive power even if the electronic device 101 moves away from the power transmission device 201 by several centimeters or more. The electronic device 101 may perform wireless charging using the received power. However, the method of transmitting and receiving power between the power transmission device 201 and the electronic device 101 is not limited to the above-described method.

The situation between the electronic device 101 and the power transmission device 201 may be, for example, the situation 210 or a situation 220. However, it is not limited thereto.

In the situation 210, the electronic device 101 may enter the wireless charging area 203 while being held by a user. For example, the user may enter the area 203 while holding the electronic device 101 with his or her hand or carrying the same in a pocket. If the electronic device 101 receives high-energy power from the power transmission device 201 while entering the area 203 in the state of being held by the user, it may have a harmful effect on the user. Accordingly, in various embodiments, the electronic device 101 may transmit information (or data) to the power transmission device 201 to restrict power transmission while the user is near the electronic device 101. The restriction of power transmission may include prohibiting power transmission or reducing the amount of transmitted power. The power transmission device 201 may not transmit power to the electronic device 101, or may reduce the amount of transmitted power based on reception of the information (or data) from the electronic device 101.

In the situation 220, the user may access the electronic device 101 while the electronic device 101 performs wireless charging in the area 203. For example, the user may access the electronic device 101 and use the electronic device 101 during wireless charging. If the electronic device 101 receives high-energy power from the power transmission device 201 while the electronic device 101 is in proximity or contact with the user, it may have a harmful effect on the user. Accordingly, in various embodiments, the electronic device 101 may transmit information (or data) to the power transmission device 201 to restrict (e.g., prohibit or reduce) power transmission while the user is around the electronic device 101. The electronic device 101 may transmit the information (or data) before the user contacts the electronic device 101 by identifying that a human body is close to the electronic device 101. The power transmission device 201 may not transmit power to the electronic device 101 or may reduce the amount of transmitted power based on the reception of the information (or data).

As described above, the electronic device 101 according to various embodiments may prevent a user from directly contacting a power transmission path.

Figure 3:
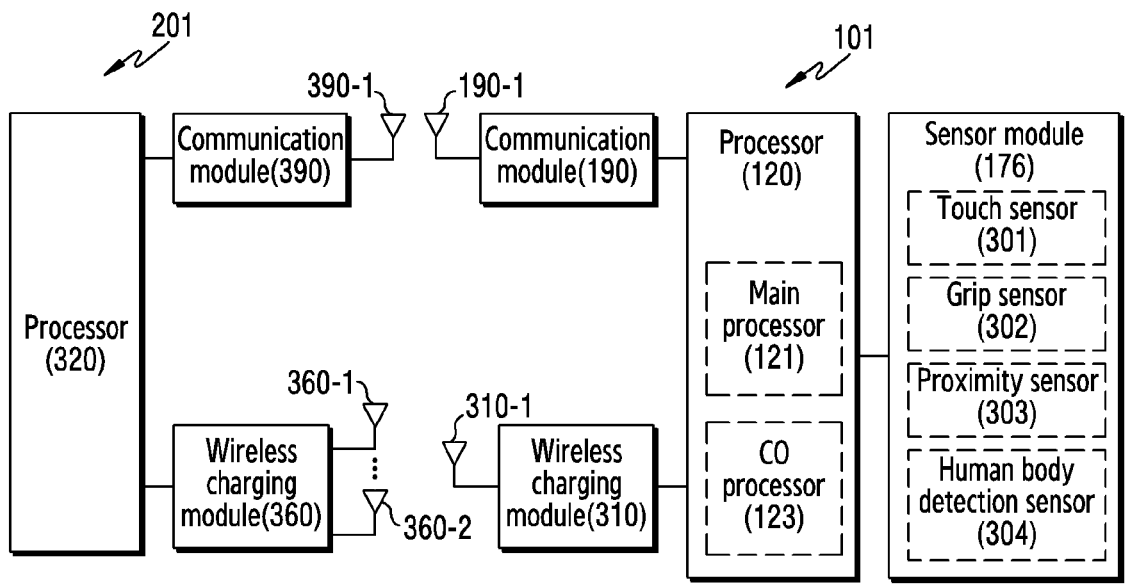
FIG. 3 illustrates an example of the functional configuration of each of an electronic device and a power transmission device according to various embodiments.

FIG. 3 illustrates an example of the functional configuration of each of the electronic device 101 and the power transmission device 201 according to various embodiments.

Referring to FIG. 3, the electronic device 101 may include a sensor module 176, a communication module 190, a wireless charging module 310 (e.g., a power management module 188), and a processor 120. However, the disclosure is not limited thereto, and some components may be omitted from the electronic device 101, or other components may be added to the electronic device 101.

The sensor module 176 may detect that a human body is close to the electronic device 101. For example, the sensor module 176 may measure a physical quantity and may convert the same into an electric signal or generate a data value. The electrical signal or data value may indicate how close the human body is to the electronic device 101. The sensor module 176 may include, for example, a touch sensor 301, a grip sensor 302, a proximity sensor 303, a human body detection sensor (passive infrared sensor {PIR}) 304, and the like. The sensor module 176 may further include a camera sensor (not shown). The sensor module 176 may use at least one of the touch sensor 301, the grip sensor 302, the proximity sensor 303, the human body detection sensor 304, or the camera sensor to generate an electric signal or data value indicating how close a human body is to the electronic device 101. The sensor module 176 may be connected to a main processor 121 or a coprocessor 123. The sensor module 176 may be controlled by a coprocessor 123 (e.g., a sensor hub processor) even while the main processor 121 is in an inactive (e.g., sleep) state.

The communication module 190 may support wireless communication between the electronic device 101 and the power transmission device 201. The communication module 190 may be connected to an antenna 190-1 (e.g., the antenna module 197). In various embodiments, the communication module 190 may receive a signal related to wireless charging from the power transmission device 201 through the antenna 190-1. In some embodiments, the communication module 190 may receive a signal (e.g., Ping), indicating that wireless charging is possible, from the power transmission device 201 through the antenna 190-1. The signal may be a broadcast signal for identifying that the electronic device 101 capable of wireless charging. The signal may be broadcasted from the power transmission device 201 to determine whether the wireless rechargeable electronic device 101 (i.e., a power receiver) exists within the area 203. The communication module 190 may transmit a response to the signal (e.g., identification information or configuration information of the electronic device 101) to the power transmission device 201 through the antenna 190-1. The communication module 190 may transmit packets (e.g., various packets such as Ack or power reception amount) to be transmitted to perform a procedure related to wireless charging in response to the signal. In some embodiments, the communication module 190 may transmit a signal, indicating that wireless charging is possible, to the power transmission device 201 through the antenna 190-1. For example, when a signal output from the power transmission device 201 (e.g., the wireless charging module 360) is received by the electronic device 101 at a certain strength or more, the communication module 190 may transmit the signal, indicating that wireless charging is possible, to the power transmission device 201 in response to the signal.

The communication module 190 may exchange identification information and/or configuration information with the power transmission device 201 (e.g., the communication module 390 of the power transmission device 201) through the antenna 190-1. The identification information may include identification information of the electronic device 101 or identification information of the power transmission device 201. For example, the communication module 190 receives or transmits a signal (e.g., Ping), indicating that wireless charging is possible, from or to the power transmission device 201, and may then transmit the identification information or configuration information of the electronic device 101 to the power transmission device 201. The configuration information may include, for example, information on the maximum amount of power that the electronic device 101 can receive, status information of the amount of received power, or location information of the electronic device 101. The configuration information may include data used by the power transmission device 201 to check the distance between the electronic device 101 and the power transmission device 201. Alternatively, the configuration information may include data used by the power transmission device 201 to check the relative position of the electronic device 101 with respect to the power transmission device 201 (e.g., location information of the electronic device 101).

The communication module 190 may transmit data for adjusting the power to be output by the power transmission device 201 to the power transmission device 201 through the antenna 190-1. In some embodiments, the communication module 190 may transmit information indicating that the human body is close to the electronic device 101 (or data indicating the degree of proximity). For example, the communication module 190 may transmit data, indicating a value detected through the sensor module 176, to the power transmission device 201. In some other embodiments, the communication module 190 may transmit control information for adjusting power transmission to the power transmission device 201. The control information may include, when the human body approaches the electronic device 101, at least one of a request to reduce transmission power, a request to stop power transmission, a request not to start power transmission, or a request to transmit power transmission with a specific power value determined by the electronic device 101. The control information may include, when the human body moves away from the electronic device 101, at least one of a request to increase transmission power again or a request to resume power transmission.

The wireless charging module 310 may be connected to a wireless charging antenna 310-1 (e.g., the antenna module 197). The wireless charging module 310 may wirelessly receive power from the power transmission device 201 through the wireless charging antenna 310-1. According to various embodiments, the wireless charging antenna 310-1 may include at least one coil. The wireless charging module 310 may support various wireless charging methods including, for example, an inductive charging method, an electromagnetic resonance method, or an electromagnetic radiation method.

The processor 120 may control the overall operation of the electronic device 101. The processor 120 may receive commands from other components (e.g., the sensor module 176, the communication module 190, and the wireless charging module 310), may interpret the received commands, and may perform calculations or process data according to the interpreted commands. The processor 120 may be implemented as software, may be implemented as hardware such as a chip, a circuit, or the like, or may be implemented as a combination of software and hardware. The processor 120 may be one or a combination a plurality of processors.

In various embodiments, the processor 120 may receive a signal (e.g., Ping), indicating that wireless charging is possible, from the power transmission device 201 through the communication module 190. In response to the reception, the processor 120 may transmit a response including identification information or configuration information of the electronic device 101 to the power transmission device 201.

In various embodiments, the processor 120 may transmit the signal indicating that wireless charging is possible to the power transmission device 201 through the communication module 190 when a signal output from the wireless charging antenna (e.g., 360-1 or 360-2) of the power transmission device 201 is received at a certain strength or more, instead of receiving the signal indicating that wireless charging is possible from the power transmission device 201. The processor 120 may exchange the identification information and/or configuration information with the power transmission device 201 (e.g., the communication module 390) based on transmission of the signal indicating that wireless charging is possible to the power transmission device 201.

In various embodiments, the processor 120 may control the sensor module 176 to detect whether the human body approaches the electronic device 101. In some embodiments, in response to reception of the signal (e.g., Ping) indicating that wireless charging is possible from the power transmission device 201, the processor 120 may control the sensor module 176 to detect how close the human body is to the electronic device 101. Alternatively, in response to transmission of the configuration information to the power transmission device 201, the processor 120 may control the sensor module 176 to detect how close the human body is to the electronic device 101. Only when the signal (e.g., Ping) is received or the configuration information is transmitted, is the detection is performed, thereby reducing consumption power.

In some other embodiments, the processor 120 may control the sensor module 176 to periodically detect how close the human body is to the electronic device 101. By periodically performing the detection irrespective of wireless charging, the complexity of processing can be reduced.

In still other embodiments, the processor 120 may control the sensor module 176 to perform the detection every designated period from the time point at which the signal (e.g., Ping) indicating that wireless charging is possible is first received. In addition, if the signal (e.g., Ping) is not received for a designated time or longer, the processor 120 may control the sensor module 176 to stop the detection. However, the disclosure is not limited thereto.

The detection of proximity of the human body as described above may be performed by the coprocessor 123 (e.g., a sensor hub processor) even while the main processor 121 is in an inactive (e.g., sleep) state.

In various embodiments, the processor 120 may transmit data for adjusting power to be output by the power transmission device 201 to the power transmission device 201 through the communication module 190. In some embodiments, the processor 120 may transmit data indicating how close the human body is to the electronic device 101. For example, the processor 120 may transmit data indicating a value detected through the sensor module 176 to the power transmission device 201. In some other embodiments, the processor 120 may transmit control information (e.g., a request or command) for adjusting power transmission, instead of the data indicating how close the human body is to the electronic device 101, to the power transmission device 201 through the communication module 190. The control information may include, when the human body approaches the electronic device 101, at least one of a request to reduce transmission power, a request to stop power transmission, a request not to start power transmission, or a request to transmit power transmission at a specific power value determined by the electronic device 101. The control information may include, when the human body moves away from the electronic device 101, at least one of a request to increase transmission power again or a request to resume power transmission. The processor 120 may generate the control information (e.g., a request) based on a value detected through the sensor module 176 in order to transmit the control information.

The time point at which the processor 120 transmits the data or the information may be variously determined. In some embodiments, in response to the reception of the signal (e.g., Ping) indicating that wireless charging is possible (or transmission of the configuration information), the processor 120 may transmit the data indicating how close the human body is to the electronic device 101 to the power transmission device 201. In other words, in response to reception of the signal indicating that wireless power transfer is possible, the processor 120 may identify the value detected through the sensor module 176 and may transmit data indicating the identified value.

In some other embodiments, in response to identifying that the human body approaches the electronic device 101 within a designated distance or less, the processor 120 may transmit the data indicating the value detected through the sensor module 176. In other words, when the value detected through the sensor module 176 is within a designated range, the processor 120 may transmit the data indicating the detected value.

In still some other embodiments, the processor 120 may identify the proximity of the human body to the electronic device 101 within a designated distance or less, and may transmit, in response to receiving the signal (e.g., Ping) indicating that wireless charging is possible, data indicating a value detected through the sensor module 176. However, the disclosure is not limited thereto.

In various embodiments, the processor 120 may wirelessly receive power from the power transmission device 201 through the wireless charging module 310. The power may be adjusted by the power transmission device 201 based on data (e.g., data indicating a sensor value) or information (e.g., a request) received from the electronic device 101. For example, when the human body approaches the electronic device 101 to a designated distance or less, the power transmission device 201 may reduce the transmission power or stop power transmission.

The operations of the processor 120 as described above may be performed by the main processor 121 or the coprocessor 123. The operations as described above are performed independently from the main processor 121, and may be performed using lower power than the main processor 121 or the coprocessor 123 specialized for a designated function (e.g., a sensor hub processor or a communication processor). For example, the coprocessor 123 may perform the above-described operations together with the main processor 121 while the main processor 121 is in an active state (e.g., executes an application), or in place of the main processor 121 while the main processor 121 is in an inactive state (e.g., is asleep).

The power transmission device 201 may include the communication module 390, the wireless charging module 310, and the processor 320, but is not limited thereto, and some components may be omitted from the power transmission device 201, or other components may be added to the power transmission device 201.

The communication module 390 may support wireless communication between the power transmission device 201 and the electronic device 101. The communication module 390 may be connected to the antenna 390-1. The communication module 390 may broadcast the signal (e.g., Ping), indicating that wireless charging is possible, to the surroundings through the antenna 390-1. The signal may be a signal for checking whether an electronic device 101 (i.e., a power receiver) capable of performing wireless charging exists in the area 203. The signal may be a broadcast signal for identifying the electronic device 101 capable of wireless charging. The communication module 390 may receive a response to the signal from the electronic device 101 that received the signal through the antenna 390-1. The communication module 390 may receive the signal indicating that wireless charging is possible from the electronic device 101 (e.g., the communication module 190 of the electronic device 101).

The communication module 390 may receive data for adjusting the transmission power to be output through the wireless charging module 360 from the electronic device 101 through the antenna 390-1. In some embodiments, the communication module 390 may receive information indicating that the human body approaches the electronic device 101 from the electronic device 101. For example, the information may indicate how close the human body is to the electronic device 101. The information may represent a value detected through the sensor module 176 of the electronic device 101. In some other embodiments, the communication module 390 may receive control information (e.g., a request) for adjusting transmission power from the electronic device 101.

The processor 320 may control the overall operation of the power transmission device 201. The processor 120 may receive commands from other components (e.g., the sensor module 176, the communication module 190, and the wireless charging module 310), may interpret the received commands, and may perform calculation or process data according to the interpreted commands. The processor 120 may be implemented as software, may be implemented as hardware such as a chip, circuitry, or the like, or may be implemented as a combination of software and hardware. The processor 120 may be one or a combination a plurality of processors.

According to various embodiments, the processor 320 may broadcast the signal (e.g., Ping), indicating that wireless charging is possible, through the communication module 390. The processor 320 may receive a response including identification information or configuration information of the electronic device 101 from the electronic device 101 that received the signal. The processor 320 may receive the signal indicating that wireless charging is possible from the electronic device 101, and may exchange the identification information or the configuration information with the electronic device 101.

In various embodiments, the processor 320 may receive data for adjusting the transmission power to be output through the wireless charging module 360 from the electronic device 101 through the communication module 390. The processor 320 may receive information (or data) indicating that a human body is close to the electronic device 101 through the communication module 390. In some embodiments, the processor 320 may receive data, indicating how close the human body is to the electronic device 101, from the electronic device 101. For example, the processor 320 may receive a sensor value detected through the sensor module 176 of the electronic device 101. In some other embodiments, the processor 320 may receive control information (e.g., a request or a command) for adjusting transmission power from the electronic device 101. For example, the processor 320 may receive control information, indicating that power transmission is to be restricted (e.g., prohibited or reduced), from the electronic device 101.

In various embodiments, the processor 320 may determine the power to be transmitted to the electronic device 101 based on the received information (or data). For example, when identifying that the human body is within a designated distance from the electronic device 101 based on the received information (or data), the processor 320 may reduce transmission power or stop power transmission. In another example, the processor 320 may reduce transmission power or stop power transmission according to control information (e.g., a request or a command) received from the electronic device 101.

In some embodiments, when identifying that the proximity of the human body to the electronic device 101 is a first level or higher (e.g., closer than a first distance), the processor 320 may not transmit power to the electronic device 101. Whether the human body is closer than a first distance from electronic device 101 may be identified based on, for example, a sensor value detected through the sensor module 176 of the electronic device 101. For example, the processor 320 may receive data indicating a sensor value detected through the sensor module 176 from the electronic device 101, and may determine that the human body is closer than a first distance from the electronic device 101 when it is identified that the data value is within a first range.

Upon identifying that the human body is not closer to the electronic device 101 than the first distance but is closer than a second distance, the processor 320 may reduce the power to be transmitted to the electronic device 101. For example, the processor 320 may output power lower than the maximum power in order to transmit power to the electronic device 101. The second level may be a level lower than the first level. The second level may represent a distance greater than the first level. For example, the processor 320 may receive data representing a sensor value detected through the sensor module 176 from the electronic device 101, and may determine that the human body is closer than the second distance to the electronic device 101 when identifying that the data value is within a second range.

When it is identified that the human body is close to the electronic device 101, the processor 320 may determine how much to reduce the power to be output for transmission to the electronic device 101. The processor 320 may determine the transmission power based on information (or data) received from the electronic device 101, according to a table, an algorithm, or an equation stored in the memory of the power transmission device 201.

For example, the processor 320 may determine the reduction in transmission power based on how close the human body is to the electronic device 101 (e.g., based on the sensor value detected through the sensor module 176). The processor 320 may transmit less power the closer the human body is to the electronic device 101. In another example, the processor 320 may determine the reduction in transmission power based on the distance between the power transmission device 201 and the electronic device 101. The processor 320 may transmit less power the closer the power transmission device 201 is to the electronic device 101. In another example, the processor 320 may determine the reduction in transmission power based on the amount of power received by the electronic device 101. The processor 320 may transmit less power as the amount of power received by the electronic device 101 increases.

However, the disclosure is not limited thereto, and at least some of the above-described operations may be performed by the processor 120 of the electronic device 101. For example, the processor 120 of the electronic device 101 may directly determine the power reduction amount and may transmit control information for transmitting the determined power to the power transmission device 201. The power transmission device 201 may transmit the reduced amount of power, according to the received control information, to the electronic device 101, or may not transmit the power.

In various embodiments, the processor 320 may control the wireless charging module 360 to transmit the determined power as described above.

The wireless charging module 360 may be connected to one or more wireless charging antennas 360-1 and 360-2. The wireless charging module 360 may wirelessly transmit power to the electronic device 101 through the wireless charging antennas 360-1 and 360-2. The wireless charging module 360 may support various wireless charging methods including, for example, an inductive charging method, an electromagnetic resonance method, or an electromagnetic radiation method.

The wireless charging module 360 may transmit power to the one or more electronic devices 101 and 102, respectively, using beamforming through the one or more wireless charging antennas 360-1 and 360-2. For example, the wireless charging module 360 may transmit first power to the electronic device 101 through the wireless charging antenna 360-1, and may transmit second power, different from the first power, to the other electronic device 102 through the wireless charging antenna 360-2.

Figure 4:
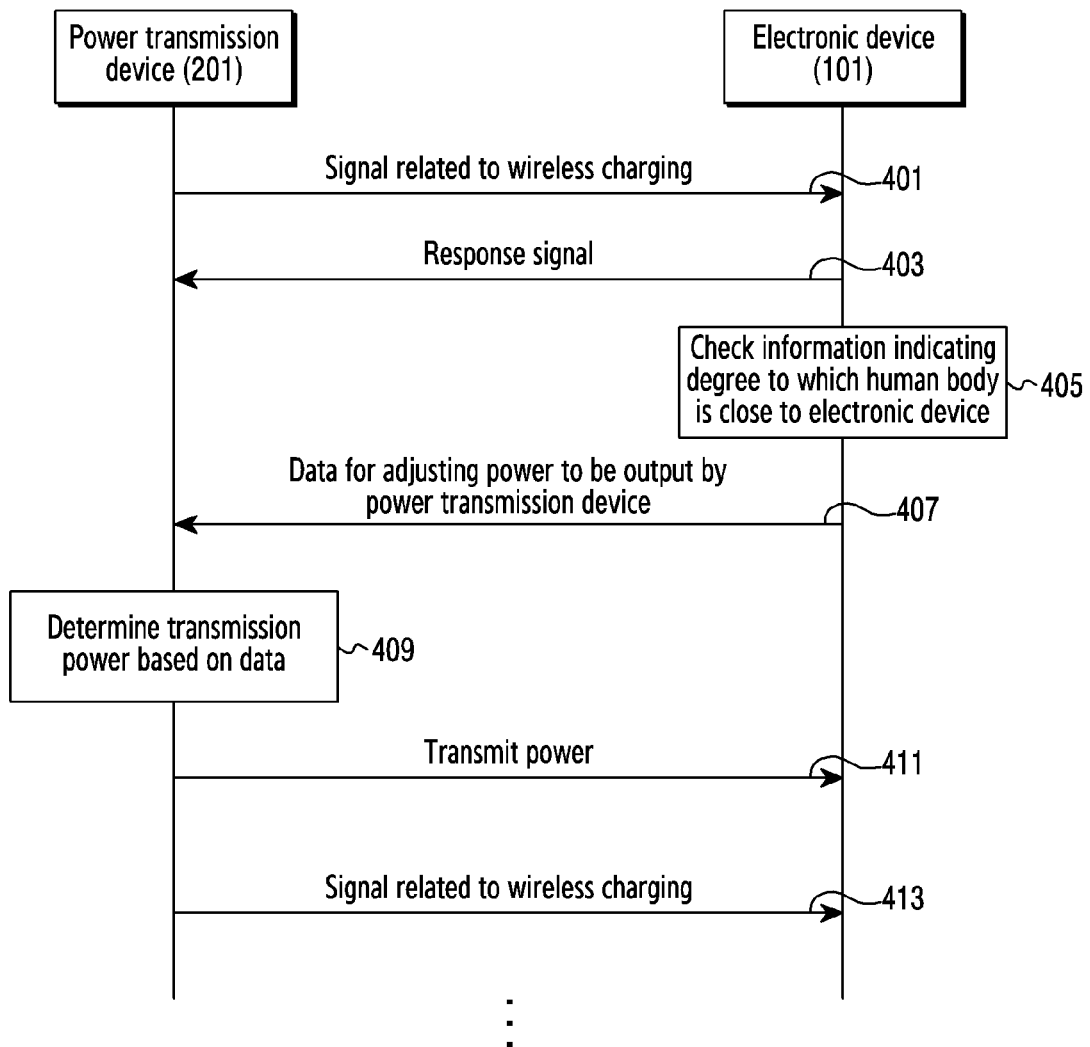
FIG. 4 illustrates an example of signal flow between an electronic device and a power transmission device according to various embodiments.

FIG. 4 illustrates an example of signal flow between the electronic device 101 and the power transmission device 201 according to various embodiments.

Referring to FIG. 4, in operation 401, the power transmission device 201 (e.g., the processor 320) may transmit a signal related to wireless charging. For example, the power transmission device 201 may transmit a signal (e.g., Ping), indicating that wireless charging is possible, through the communication module 390. The signal may be a broadcast signal for identifying the electronic device 101 capable of wireless charging. The signal may be broadcasted to check whether the electronic device 101 (i.e., a power receiver) capable of wireless charging exists within the area 203. The electronic device 101 may receive the signal through the communication module 190. In another example, the power transmission device 201 may output the signal indicating that wireless charging is possible through the wireless charging module 360, instead of transmitting the signal indicating that wireless charging is possible through the communication module 390, and may receive the signal indicating that wireless charging is possible from the electronic device 101, which has received the signal at a predetermined strength or more.

In operation 403, the electronic device 101 (e.g., the processor 120) may transmit a response signal to the signal related to wireless charging received in operation 401 to the power transmission device 201 (e.g., the communication module 390) through the communication module 190. For example, the response signal may include at least one of ACK to the signal related to wireless charging, identification information and configuration information of the electronic device 101, or various packets used to perform a procedure related to wireless charging (e.g., the amount of power received by the electronic device 101). For example, when receiving a signal output from the wireless charging module 360 of the power transmission device 201 at a predetermined strength or more in operation 401, the electronic device 101 may transmit the signal indicating that wireless charging is possible to the power transmission device 201 as the response signal.

In various embodiments, the electronic device 101 and the power transmission device 201 may exchange identification information of the electronic device 101, identification information of the power transmission device 201, and/or configuration information through the communication module 190 or 390. For example, in response to operation 401, the electronic device 101 may transmit a response including the identification information or configuration information of the electronic device 101 to the power transmission device 201. The configuration information may include at least one of information on the maximum amount of power that the electronic device 101 can receive, information on the strength of a signal received by the electronic device 101, or information on the distance between the electronic device 101 and the power transmission device 201. For example, the electronic device 101 may compare the strength of a signal transmitted from the power transmission device 201 with the strength of a signal received from the electronic device 101 to identify the distance between the electronic device 101 and the power transmission device 201. The configuration information transmitted from the electronic device 101 may include data used by the power transmission device 201 to check the distance between the electronic device 101 and the power transmission device 201. Alternatively, the configuration information transmitted from the electronic device 101 may include data (e.g., location information of the electronic device 101) used by the power transmission device 201 to check the relative position of the electronic device 101 with respect to the power transmission device 201. For example, the configuration information may include power-amount state information received from the electronic device 101 or location information of the electronic device 101.

The power transmission device 201 may receive identification information or configuration information from the electronic device 101 through the communication module 390. In operation 405, the electronic device 101 (e.g., the processor 120) may check information indicating how close the human body is to the electronic device 101. The electronic device 101 may check whether a human body is close to the electronic device 101 using the sensor module 176. For example, the electronic device 101 may use the sensor module 176 to detect how close the human body is to the electronic device. In various embodiments, the time point for the checking is not limited.

For example, the electronic device 101 (e.g., the processor 120) may check how close the human body is to the electronic device 101 in response to receiving the signal related to wireless charging (e.g., the signal indicating that wireless charging is possible) in operation 401. Alternatively, in operation 403, the electronic device 101 may check how close the human body is to the electronic device 101 in response to exchanging the identification information or the configuration information with the power transmission device 201.

In another example, the electronic device 101 (e.g., the processor 120) may periodically detect how close the human body is to the electronic device 101 regardless of whether the signal indicating that wireless charging is possible is received. The electronic device 101 may temporarily store the detected value. In response to receiving the signal related to wireless charging in operation 401 or exchanging the identification information or the configuration information with the power transmission device 201 in operation 403, the electronic device 101 may identify a temporarily stored sensor value, and may transmit the identified value to the power transmission device 201.

In still another example, the electronic device 101 (e.g., the processor 120) may perform the detection every designated period from the time point at which the signal related to wireless charging is first received. The electronic device 101 may stop the detection if the signal indicating that wireless charging is possible is not received for a predetermined time or longer.

In operation 407, the electronic device 101 (e.g., the processor 120) may transmit data for adjusting the power to be output by the power transmission device 201 to the power transmission device 201 through the communication module 190. In some embodiments, the electronic device 101 may transmit data indicating how close the human body is to the electronic device 101 so that the power transmission device 201 adjusts transmission power. In some other embodiments, the electronic device 101 may transmit control information (e.g., a request) that causes the power transmission device 201 to adjust transmission power. Although not shown, the electronic device 101 may generate control information based on the information checked in operation 405 or the sensor value detected through the sensor module 176.

In various embodiments, the time point of the transmission (operation 407) is not limited. For example, the electronic device 101 may transmit data for adjusting the power to be output by the power transmission device 201 in response to receiving the signal related to wireless charging in operation 401. As another example, the electronic device 101 may transmit the data (e.g., sensor value or request) in response to exchanging the configuration information in operation 403. In another example, the electronic device 101 may transmit the data in response to identifying that the human body is closer than a specific distance to the electronic device 101, regardless of whether the signal related to wireless charging is received.

The order of operation 403 and operation 407 may be changed. Operation 403 and operation 407 may be performed independently or in parallel. Alternatively, the data for adjusting the power to be output by the power transmission device may be included in the response (e.g., the identification information or the configuration information) to the signal (e.g., Ping) indicating that wireless charging is possible, and may be transmitted.

The power transmission device 201 may receive the data for adjusting the power to be output by the power transmission device from the electronic device 101 through the communication module 390.

In operation 409, the power transmission device 201 (e.g., the processor 320) may determine the power to be transmitted to the electronic device 101 based on the received data. The power transmission device 201 may identify the location of the electronic device 101 or the distance between the power transmission device 201 and the electronic device 101 based on the identification information or configuration information received in operation 403. The power transmission device 201 may determine the power to be transmitted to the electronic device 101 based on the distance between the power transmission device 201 and the electronic device 101, the disposition of the electronic device 101, or the strength of a signal received by the electronic device 101. In this case, the power transmission device 101 may adjust the power to be transmitted based on the data received in operation 407. For example, when receiving the data indicating how close the human body is to the electronic device 101 (e.g., a sensor value), the power transmission device 201 may determine the power to be transmitted to the electronic device 101 based on the received data. When it is identified that the human body is close to the electronic device 101 based on the received data, the power transmission device 201 may reduce transmission power or may stop power transmission. The power transmission device 201 may determine the transmission power with reference to a table, algorithm, or equation stored in the memory of the power transmission device 201 based on the information (or data) received from the electronic device 101. In another example, when control information (e.g., a request) for adjusting power transmission is received, the power transmission device 201 may determine the power to be transmitted to the electronic device 101 based on the received control information.

In some embodiments, the power transmission device 201 may determine the transmission power based on how close the human body is to the electronic device 101 (i.e., based on the sensor value detected through the sensor module 176). When it is identified that the human body is closer than a second distance to the electronic device 101, the power transmission device 201 may transmit power less than the maximum power to the electronic device 101. The power transmission device 201 may transmit less power the closer the human body is to the electronic device 101. When it is identified that the human body is closer than a first distance to the electronic device 101, the power transmission device 201 may not transmit power to the electronic device 101. The first level may represent a closer distance than the second level.

In some other embodiments, the power transmission device 201 may transmit the power to be transmitted to the electronic device 101 when the human body is close to the electronic device 101 based on the distance between the power transmission device 201 and the electronic device 101. The information on the distance between the power transmission device 201 and the electronic device 101 may be identified based on the strength of the signal received by the electronic device 101 in operation 401. Information on the distance between the power transmission device 201 and the electronic device 101 may be included in the identification information or the configuration information in operation 403. When the human body is close to the electronic device 101, the power transmission device 201 may transmit less power the closer the power transmission device 201 is to the electronic device 101.

In still other embodiments, when the human body is determined to be close to the electronic device 101 based on the strength of the signal received by the electronic device 101, the power transmission device 201 may determine the power to be transmitted to the electronic device 101. Information on the strength of the signal received by the electronic device 101 may be included in the identification information or the configuration information in operation 403. When the human body is close to the electronic device 101, the power transmission device 201 may transmit less power as the strength of the signal received at the electronic device 101 increases.

At least a part of the determination operation described above may be performed by the processor 320 of the power transmission device 201, or may be performed by the wireless charging module 360 of the power transmission device 201.

The at least a part of the determination operation as described above may be performed by the electronic device 101. For example, the processor 120 of the electronic device 101 may directly determine the power reduction amount in operation 405, and may transmit control information for transmitting the determined power to the power transmission device 201.

In operation 411, the power transmission device 201 (e.g., the processor 320) may transmit the determined power to the electronic device 101 through the wireless charging module 360. The power transmission device 201 may output the reduced power for a designated time based on identifying that the human body is close to the electronic device 101. The electronic device 101 may receive the reduced power from the power transmission device 201 through the wireless charging module 310.

In operation 401, an operation of broadcasting the signal related to wireless charging (e.g., the signal indicating that wireless charging is possible, Ping) may be periodically performed by the communication module 390 of the power transmission device 201. Accordingly, in operation 413, the power transmission device 201 may broadcast the signal related to wireless charging through the communication module 390, and then operations 403 to 411 may be repeated.

The operations of FIG. 4 can be applied to both situations 210 and 220 shown in FIG. 2.

Figure 5:
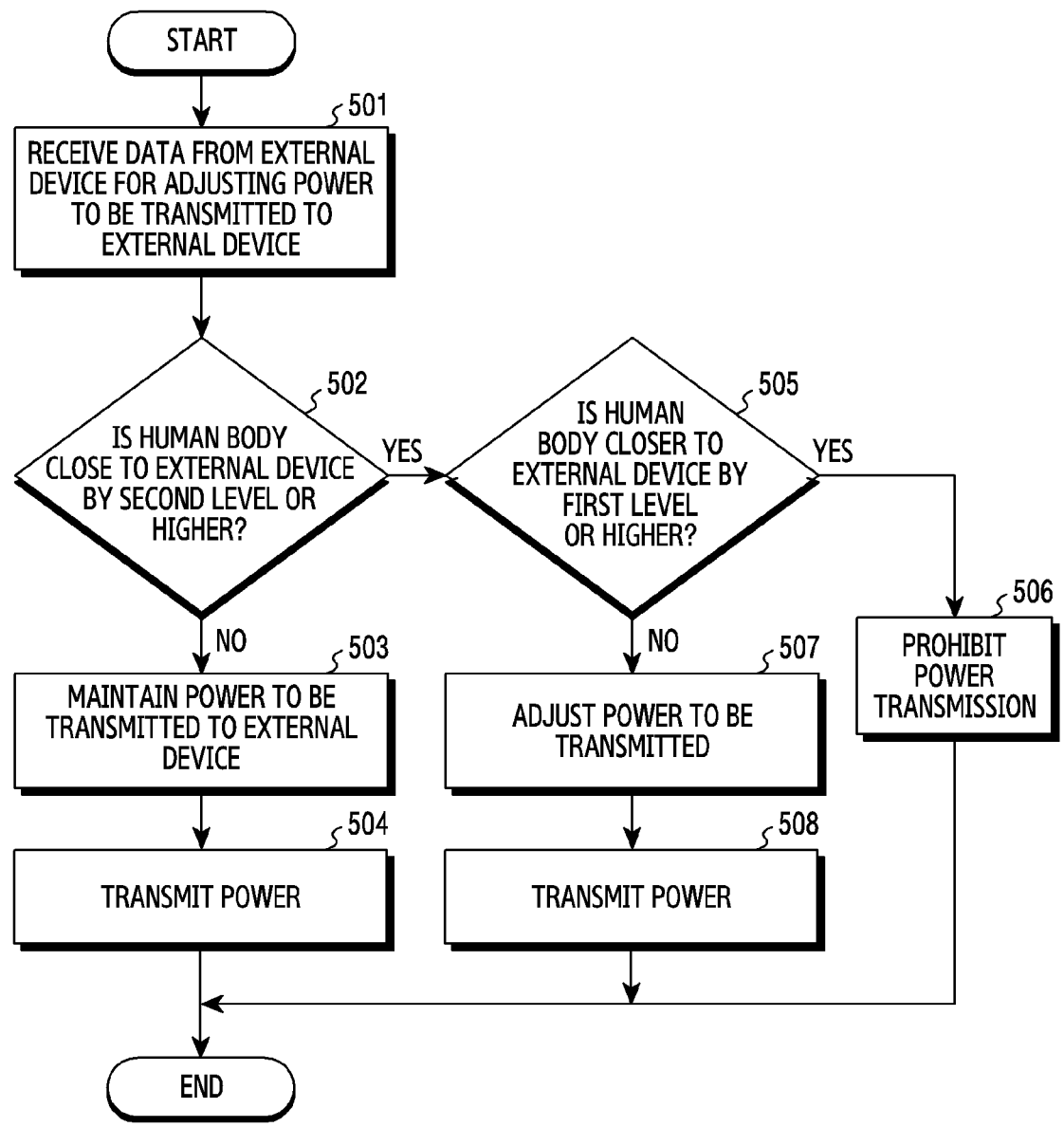
FIG. 5 illustrates an example of the operation of a power transmission device according to various embodiments.

FIG. 5 illustrates an example of the operation of a power transmission device 201 according to various embodiments.

Referring to FIG. 5, in operation 501, the power transmission device 201 (e.g., the processor 320) may receive, from the external device, data for adjusting the power to be transmitted to an external device (e.g., the electronic device 101). For example, the power transmission device 201 may receive data indicating how close a human body is to the external device. For example, the data may indicate how close the human body is to the external device, which is detected through a sensor module (e.g., the touch sensor 301, the grip sensor 302, the proximity sensor 303, and the human body detection sensor {passive infrared sensor, PIR} 304) of the external device. In another example, the power transmission device 201 may receive, from the external device, control information (e.g., a request) for adjusting the power to be transmitted to the external device.

In some embodiments, the power transmission device 201 (e.g., the processor 320) may receive the data before starting wireless charging of the external device (e.g., the electronic device 101), as in situation 210 of FIG. 2. In this case, the power transmission device 201 may receive the data in response to transmitting the signal related to wireless charging (e.g., the signal indicating that wireless charging is possible) to the external device (e.g., the electronic device 101). The power transmission device 201 may receive the data based on identification information or configuration information exchanged with the external device. In some other embodiments, the power transmission device 201 may receive the data while wirelessly charging the external device, as in the situation 220 of FIG. 2. In this case, the power transmission device 201 may wirelessly transmit power to the external device at a specific intensity before operation 501.

In operation 502, the power transmission device 201 (e.g., the processor 320) may identify whether the human body is close to the external device (e.g., the electronic device 101) based on the received data. For example, if it is identified that the human body is not closer than a second distance to the external device, the power transmission device 201 (e.g., the processor 320) may maintain the power to be transmitted to the external device in operation 503. Before starting wireless charging of the external device, such as in situation 210, the power transmission device 201 may maintain the power to be transmitted, which is determined based on at least one of the location of the external device, the distance thereto, or the strength of the signal received by the external device. When the power transmission device 201 is transmitting the power to the external device as in the situation 220, the power transmission device 201 may maintain the power transmitted to the external device. In operation 504, the power transmission device 201 may transmit the power, determined to be maintained, to the external device. For example, the power transmission device 201 may transmit the maximum power when the human body is not closer than the second distance to the external device.

In operation 502, when it is identified that the human body is closer than the second distance to the external device (e.g., the electronic device 101) in operation 502, the power transmission device 201 may proceed to operation 505 to identify whether the human body is closer than the designated first distance to the external device. The first distance may be closer than the second distance. When it is identified that the human body is closer than the first distance to the external device, the power transmission device 201 may not transmit the power to the external device in operation 506.

When it is identified that the human body is not closer than the designated first distance to the external device, the power transmission device 201 may adjust (e.g., reduce) the power to be transmitted to the external device in operation 507. For example, when it is identified that the human body is closer than the designated second distance to the external device but is not closer than the first distance to the external device, the power transmission device 201 may set the power lower than the maximum power and transmit the power to the external device. The power transmission device 201 may adjust the power to be transmitted to the external device based on the data (e.g., sensor value or adjustment request) received from the external device in operation 501.

For example, the power transmission device 201 may determine the transmission power based on how close the human body is to the external device. The power transmission device 201 may further reduce the transmission power the closer the human body is to the external device. In another example, the power transmission device 201 may determine the transmission power based on the distance between the power transmission device 201 and the external device. The power transmission device 201 may determine to reduce the transmission power because the closer the power transmission device 201 is to the external device, the greater the harm caused by proximity to the human body. The distance between the power transmission device 201 and the external device may be identified by the power transmission device 201 based on configuration information received from the external device. In another example, the power transmission device 201 may determine the transmission power based on the strength of the signal received from the external device in operation 501. The power transmission device 201 may determine to reduce the transmission power because the greater the strength of the signal received from the external device is, the greater the harm caused by proximity to the human body. The power transmission device 201 may identify the strength of the signal received from the external device based on the configuration information received from the external device.

The power transmission device 201 may adjust the transmission power based on data received from an external device, according to a table, an algorithm, or an equation stored in the memory of the power transmission device 201. In operation 508, the power transmission device 201 may wirelessly transmit the adjusted power to the external device.

The operations described above may be repeated. Although not shown, in some embodiments, when the human body moves away from the external device again, the power transmission device 201 may receive, from the external device, control information (e.g., a request) to increase the transmission power again or resume the power transmission. Alternatively, the power transmission device 201 may receive data (e.g., a sensor value) indicating how far the human body is from the external device. The power transmission device 201 may resume the power transmission or increase the transmission power based on reception of the control information or the data from the external device.

Figure 6:
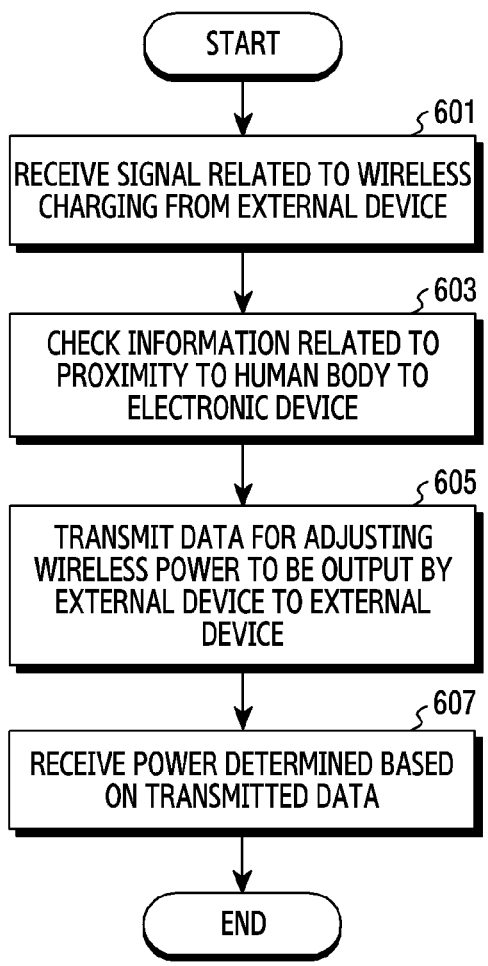
FIG. 6 illustrates an example of the operation of an electronic device according to various embodiments.

FIG. 6 illustrates an example of the operation of an electronic device 101 according to various embodiments.

Referring to FIG. 6, in operation 601, the electronic device 101 (e.g., the processor 120) may receive a signal related to wireless charging from an external device (e.g., the power transmission device 201). For example, the electronic device 101 may receive a signal (e.g., Ping), indicating that power can be wirelessly transmitted from a communication module (e.g., 390) of the external device, through the communication module 190. The electronic device 101 may transmit a response to the reception (e.g., identification information or configuration information) to the external device. In another example, the electronic device 101 may receive a signal output from a wireless charging module (e.g., 360) of the external device. When the signal is received at a predetermined strength or more, the electronic device 101 may transmit the signal indicating that wireless charging is possible to the external device. The electronic device 101 may exchange the identification information or the configuration information with the external device based on reception of the signal related to wireless charging.

In operation 603, the electronic device 101 (e.g., the processor 120) may check information (e.g., a sensor value) related to the proximity of the human body to the electronic device. For example, the electronic device 101 may use at least one of the touch sensor 301, the grip sensor 302, the proximity sensor 303, or the human body detection sensor (passive infrared sensor (PIR)) 304 to detect information (e.g., data or a value) indicating how close the human body is to the electronic device 101. For example, the electronic device 101 may detect (or check) the sensor value in response to receiving the signal related to wireless charging from the external device (e.g., the power transmission device 201). As another example, the electronic device 101 may periodically detect (or check) the sensor value regardless of whether the signal indicating that power transmission is possible is wirelessly received from the external device. As another example, the electronic device 101 may detect (or check) the sensor value based on exchanging the identification information or the configuration information with the external device.

In some embodiments, the electronic device 101 (e.g., the processor 120) may identify whether to adjust the wireless power received from the external device (e.g., the power transmission device 201) based on the detected sensor value. For example, the electronic device 101 may identify whether to reduce or stop the wireless power received from the external device upon identifying that a human body is close to the electronic device 101 based on the detected sensor value. The electronic device 101 may identify whether to increase or resume the reception of wireless power from the external device upon identifying that the human body moves away from the electronic device 101 based on the detected sensor value. The electronic device 101 may generate control information (e.g., a request) for adjusting the wireless power to be output by the external device based on the identification.

In operation 605, the electronic device 101 (e.g., the processor 120) may transmit data for adjusting the wireless power to be output by the external device to the external device (e.g., the power transmission device 201). In some embodiments, the electronic device 101 may transmit data indicating the sensor value checked in operation 603 to the external device. The data may be used by the external device to determine the transmission power using a table, an algorithm, or an equation. In some other embodiments, the electronic device 101 may transmit the control information (e.g., a request) for adjusting the wireless power to be output by the external device to the external device.

The time point of the transmission is not limited. For example, the electronic device 101 may transmit the information (e.g., the sensor value) whenever a signal indicating that power transmission is possible is wirelessly received from the external device. In another example, the electronic device 101 may transmit the information (e.g., the sensor value) only when it is identified that the human body is closer than a designated distance to the electronic device 101.

In operation 607, the electronic device 101 (e.g., the processor 120) may wirelessly receive power determined based on the transmitted data (e.g., data indicating the sensor value or a request for adjusting wireless power) from the external device (e.g., the power transmission device 201). The electronic device 101 may receive power less than the maximum power, or may not receive power based on detecting that the human body is close to the electronic device 101. In some embodiments, the electronic device 101 may receive the wireless power, which is increased again, from the external device based on detecting that the human body moves away from the electronic device 101.

Figure 7:
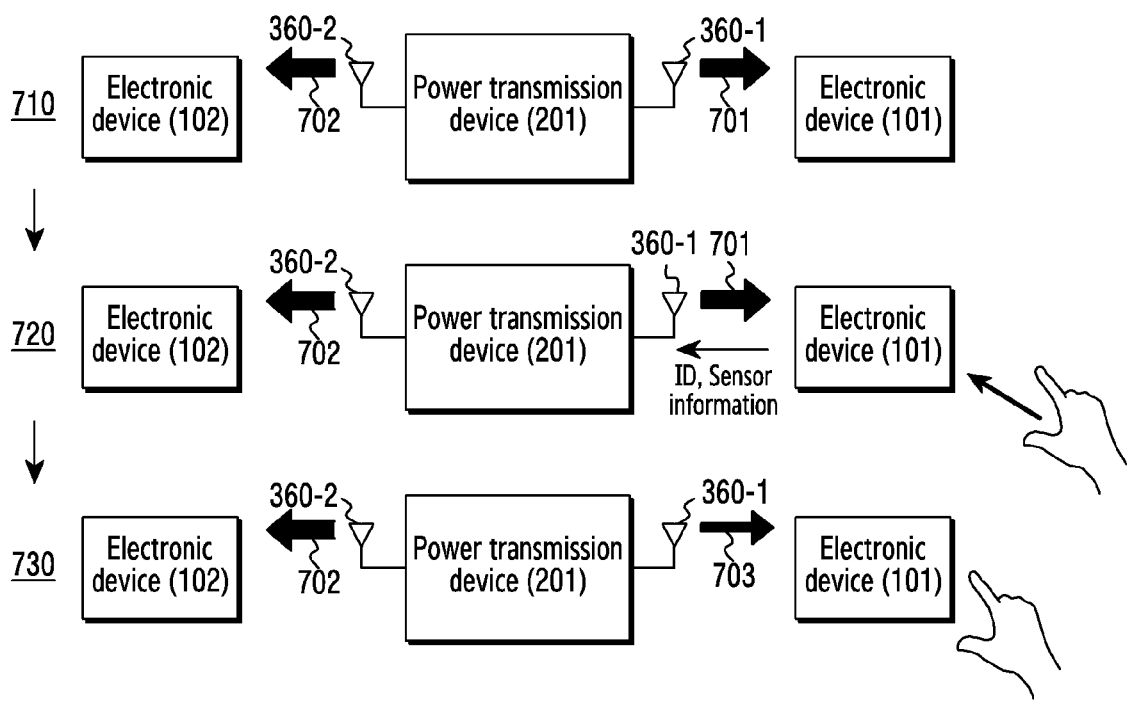
FIG. 7 illustrates an example of the situation in which a power transmission device controls transmission power with respect to each of one or more electronic devices, according to various embodiments.

FIG. 7 illustrates an example of the situation in which the power transmission device 201 controls transmission power with respect to each of one or more electronic devices 101 and 102, according to various embodiments.

Referring to FIG. 7, in operation 710, the power transmission device 201 may wirelessly transmit power to one or more electronic devices 101 and 102. For example, the power transmission device 201 may use beamforming through one or more wireless charging antennas 360-1 and 360-2 to transmit power to the one or more electronic devices 101 and 102, respectively. The power transmission device 201 may transmit first power 701 to the electronic device 101 by beamforming through the wireless charging antenna 360-1, and may transmit second power 702 to the electronic device 101 by beamforming through the wireless charging antenna 360-2. The power transmission device 201 may be aware of identification information of each of the one or more electronic devices 101 and 102 based on identification information or configuration information received from the one or more electronic devices 101 and 102 in establishing a connection with the one or more electronic devices 101 and 102.

In operation 720, a user may access the electronic device 101. The electronic device 101 may detect the proximity of the user using the sensor module 176. In some embodiments, the electronic device 101 may transmit identification information of the electronic device 101, information related to a value (e.g., a sensor value) detected through the sensor module 176, and/or information related to the location of the electronic device 101 to the power transmission device 201 based on detection of the proximity of the user. Alternatively, the electronic device 101 may transmit control information (e.g., a request) for adjusting wireless power to be output by the power transmission device 201, instead of information related to the value detected through the sensor module 176. The power transmission device 201 may receive the identification information of the electronic device 101, the value (e.g., the sensor value) detected through the sensor module 176 of the electronic device 101, and/or information related to the location of the electronic device 101.

In operation 730, the power transmission device 201 may use the identification information of the electronic device 101 and the information received from the electronic device 101 (e.g., the sensor value or the control information) to separately control only the power transmitted to the electronic device 101 between the electronic device 101 and the other electronic device 102. The power transmission device 201 may transmit third power 703 less than the first power 701 to the electronic device 101 through the wireless charging antenna 360-1. Alternatively, in some cases, the power transmission device 201 may not transmit power to the electronic device 101. The power transmission device 201 may keep transmitting the second power 702 to the other electronic device 102 through the wireless charging antenna 360-2.

An electronic device (e.g., the electronic device 101) according to various embodiments as described above may include: a communication module (e.g., the communication module 190); a sensor module (e.g., the sensor module 176); a wireless charging antenna (e.g., the wireless charging antenna 360-1 or 360-2); a wireless charging module (e.g., the wireless charging module 360) configured to be connected to the wireless charging antenna; and at least one processor (e.g., the processor 120), wherein the at least one processor is configured to: receive a signal related to wireless charging from an external device (e.g., the power transmission device 201) through the communication module; check information indicating the degree of proximity between at least a part of a human body and the electronic device using the sensor module based at least on the signal; transmit, to the external device, data for adjusting wireless power to be output by the external device based at least on the information; and receive the adjusted wireless power from the external device through the wireless charging module.

In various embodiments, the at least one processor may be configured to: perform the checking in response to reception of the signal related to wireless charging from the external device; and transmit the data to the external device in response to the checking.

In various embodiments, the at least one processor may be configured to: periodically perform the checking; temporarily store the periodically checked information; and transmit the data to the external device based at least on the temporarily stored information in response to reception of the signal.

In various embodiments, the sensor module may include at least one of a touch sensor (e.g., the touch sensor 301), a grip sensor (e.g., the grip sensor 302), a proximity sensor (the proximity sensor 303), or a human body detection sensor 304 (passive infrared sensor, PIR) (e.g., the human body detection sensor 304).

In various embodiments, the at least one processor may be configured to: check that the distance between the at least a part of the human body and the electronic device is greater than a designated level or higher by using the sensor module; and transmit the data to the external device to receive designated power less than the adjusted wireless power.

In various embodiments, the adjusted wireless power may be determined by the external device based at least on the distance between the electronic device and the external device.

In various embodiments, the data may include control information for adjusting the wireless power to be output by the external device based on the degree to which the at least a part of the human body is close to the electronic device.

In various embodiments, the at least one processor is configured to transmit the data to the external device when information acquired through the sensor module satisfies a designated condition.

A device (e.g., the power transmission device 201) for wirelessly transmitting power according to various embodiments as described above may include: a communication module (e.g., the communication module 390); a wireless charging module (e.g., the wireless charging module 360); and at least one processor (e.g., the processor 320), wherein the at least one processor is configured to: transmit a signal related to wireless charging through the communication module; receive, from an external device (e.g., the electronic device 101), data for adjusting the wireless power to be output by the device (e.g., the power transmission device 201) the data being based on information indicating the degree of proximity between the external device and at least a part of a human body identified using a sensor module (e.g., the sensor module 176) of the external device; and transmit power adjusted based on the data to the external device through the wireless charging module.

In various embodiments, the at least one processor (e.g., the processor 302) may be configured to: identify that the at least a part of the human body is closer to the external device than a designated distance based on the data; and restrict transmission of the power to the external device based on the identification.

In various embodiments, the at least one processor may be configured to: transmit first power through the wireless charging module; and transmit second power, less than the first power, based on identifying that the at least a part of the human body is closer to the external device than the designated distance, based on the data.

In various embodiments, the data may be received from the external device in response to reception of the signal related to wireless charging by the external device.

In various embodiments, the at least one processor may be configured to determine the power to be transmitted to the external device based on the distance between the device and the external device or the strength of a signal received by the external device.

In various embodiments, the at least one processor may be configured to: restrict the transmission of the power to the external device based on identifying that the at least a part of the human body is closer to the external device than the designated level, when the distance between the device and the external device is equal to or less than a designated distance.

In various embodiments, the device (e.g., the power transmission device 201) may further include: a plurality of wireless charging antennas (e.g., the wireless charging antennas 360-1 and 360-2) configured to transmit power to a plurality of external devices, wherein the at least one processor is configured to identify the power to be transmitted to each of the plurality of external devices based on data received from each of the plurality of external devices.

An electronic device (e.g., the electronic device 101) according to various embodiments as described above may include: a battery (e.g., the battery 189); a coil; a power reception circuit (e.g., the power management module 188 or the wireless charging module 310) configured to be electrically connected to the coil and the battery; a sensor module (e.g., the sensor module 176); and at least one processor (e.g., the processor 120), wherein the at least one processor is configured to: acquire power received from an external device (e.g., the electronic device 101) using the coil; check the proximity to an external object using the sensor module while acquiring the power; and transmit, to the external device, information for adjusting the power by the external device based at least on the proximity.

In various embodiments, data used by the external device to adjust the power may include control information, a command, or a request for causing the external device to adjust the power.

In various embodiments, the at least one processor may be configured to receive the power adjusted by the external device through the power reception circuit. For example, the electronic device (e.g., the electronic device 101) may further include: a charging circuit (e.g., the power management module 188 or the wireless charging module 310), wherein the at least one processor is configured to charge the battery through the charging circuit using the power adjusted by the external device.

In various embodiments, the information used by the external device to adjust the power may be detected by using the sensor module (e.g., the sensor module 176), and includes data representing a sensor value indicating how close a human body is to the electronic device, and the data representing the sensor value may be used by the external device to adjust the power.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

The invention claimed is:

1. An electronic device comprising:
a communication module;
a sensor module;
a wireless charging antenna;
a wireless charging module configured to be connected to the wireless charging antenna; and
at least one processor,
wherein the at least one processor is configured to:
receive a signal related to wireless charging from an external device through the communication module,
transmit a response to the signal related to wireless charging, to the external device through the communication module,
detect a degree of proximity between at least a part of a human body and the electronic device using the sensor module, every predetermined period from a time point at which the signal is first received,
transmit, to the external device, a first request for reducing wireless power to be output by the external device or stop power transmission, in response to identifying that the human body approaches the electronic device within a predetermined distance or less,
receive the reduced wireless power from the external device through the wireless charging module,
transmit, to the external device, a second request for increasing the wireless power, in response to identifying that the human body moves away from the electronic device greater than the predetermined distance, and
receive, from the external device, the increased wireless power through the wireless charging module,
wherein the at least one processor is further configured to stop detecting the degree of proximity between the at least a part of the human body and the electronic device, if the signal is not received for a predetermined time or longer,
wherein the response includes strength of the received signal and power amount state of the electronic device, and
wherein the wireless power to be output by the external device is determined based on the strength of the received signal and the power amount state of the electronic device.

2. The electronic device as claimed in claim 1, wherein the at least one processor is configured to:
transmit, to the external device, a data including the degree of proximity between at least a part of a human body and the electronic device, in response to the detection.

3. The electronic device as claimed in claim 1, wherein the sensor module includes at least one of a touch sensor, a grip sensor, a proximity sensor, a camera sensor, or a human body detection sensor (passive infrared sensor, PIR).

4. The electronic device as claimed in claim 1, wherein the at least one processor is configured to transmit the first request or the second request to the external device when information acquired through the sensor module satisfies a designated condition.

5. An electronic device comprising:
   a battery;
   a coil;
   a power reception circuit configured to be electrically connected to the coil and the battery;
   a sensor module; and
   at least one processor,
   wherein the at least one processor is configured to:
     acquire power received from an external electronic device using the coil,
     identify that an external object is closer than a specific distance to the electronic device using the sensor module while acquiring the power,
     transmit, to the external device, a first request for adjusting to reduce the power by the external device or stop power transmission, in response to identifying that the external object is closer than the specific distance,
     receive the power adjusted by the external device, through the power reception circuit,
     transmit, to the external device, a second request for increasing the power, in response to identifying that the external object moves away from the electronic device greater than the specific distance while receiving the adjusted power, and
     receive the power increased by the external device, through the power reception circuit,
   wherein the at least one processor is further configured to detect a degree of proximity to the external object using the sensor module every predetermined period from a time point at which a signal indicating that wireless charging is possible first received, and stop detecting the degree of proximity to the external object if the signal is not received for a predetermined time or longer,
   wherein the power is adjusted by the external device based on at least one of strength of the signal received from the external device and power amount state of the electronic device.

6. The electronic device as claimed in claim 5, further comprising:
   a charging circuit,
   wherein the at least one processor is configured to charge the battery through the charging circuit using the power adjusted by the external device.

7. The electronic device as claimed in claim 5, wherein the first request includes sensor data indicating how close a human body is to the electronic device, and
   wherein the sensor data is used to adjust the power by the external device.

* * * * *